United States Patent
Tumkur et al.

(10) Patent No.: US 10,402,290 B2
(45) Date of Patent: Sep. 3, 2019

(54) USING A PRE-INSTALLATION ENVIRONMENT TO DEBUG A SERVER WITHOUT A FUNCTIONING OPERATING SYSTEM

(71) Applicant: Microsoft Technology Licensing, LLC, Redmond, WA (US)

(72) Inventors: Kiran Ravi Tumkur, Bellevue, WA (US); Eshwar Stalin, Redmond, WA (US); Rajesh Roy, Redmond, WA (US); Fang Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/657,803

(22) Filed: Jul. 24, 2017

(65) Prior Publication Data

US 2019/0026214 A1 Jan. 24, 2019

(51) Int. Cl.
G06F 11/22 (2006.01)
G06F 11/36 (2006.01)

(52) U.S. Cl.
CPC ...... G06F 11/2294 (2013.01); G06F 11/3664 (2013.01)

(58) Field of Classification Search
CPC .............. G06F 11/0748; G06F 11/2294; G06F 11/3664; G06F 11/2278; G06F 11/2284
USPC .......................... 714/4.4, 27, 38.14; 713/1, 2
See application file for complete search history.

(56) References Cited

U.S. PATENT DOCUMENTS

| | | | | |
|---|---|---|---|---|
| 6,314,455 | B1 * | 11/2001 | Cromer | G06F 11/1417 709/217 |
| 6,766,510 | B2 * | 7/2004 | Takeda | G06F 11/3664 714/E11.21 |
| 7,401,212 | B2 * | 7/2008 | Miller | G06F 9/4406 713/1 |
| 7,512,934 | B2 * | 3/2009 | Gatlin | G06F 11/321 717/124 |
| 8,006,135 | B2 | 8/2011 | Abdul et al. | |
| 8,069,371 | B2 | 11/2011 | Sengupta et al. | |
| 8,135,989 | B2 * | 3/2012 | DeHaan | G06F 11/2294 714/25 |
| 8,312,115 | B2 | 11/2012 | Lipscombe et al. | |

(Continued)

OTHER PUBLICATIONS

"How to deploy Microsoft Windows Preinstallation Environment from an RIS server by using PXE-enabled clients", https://support.microsoft.com/en-in/help/304992/how-to-deploy-microsoft-windows-preinstallation-environment-from-an-ris-server-by-using-pxe-enabled-clients, Retrieved on: Jun. 15, 2017, 6 pages.

*Primary Examiner* — Joseph R Kudirka
(74) *Attorney, Agent, or Firm* — Christopher J. Volkmann; Kelly, Holt & Christenson, PLLC

(57) ABSTRACT remote server machine, without an accessible operating system, is identified. A management computing system sends, to the remote server machine to be tested, a pre-installation environment image that has a pre-configured remote execution service disposed thereon. The pre-installation environment image is loaded into memory on the remote server machine to be tested and the remote execution service automatically runs and exposes an application programming interface (API). A client application on the management computing system interacts with the API to execute a debugging script on the remote server machine, and receives the result of the executed scripts through the API.

20 Claims, 9 Drawing Sheets

(56) References Cited

U.S. PATENT DOCUMENTS

| | | |
|---|---|---|
| 9,336,009 B1 | 5/2016 | Feeser et al. |
| 9,384,032 B2 | 7/2016 | Lirbank et al. |
| 9,665,452 B2 * | 5/2017 | Swierk ................ G06F 11/2284 |
| 2013/0007224 A1 | 1/2013 | Yang |
| 2013/0247136 A1 | 9/2013 | Chieu et al. |

* cited by examiner

USING A PRE-INSTALLATION ENVIRONMENT TO DEBUG A SERVER WITHOUT A FUNCTIONING OPERATING SYSTEM

BACKGROUND

Computing systems are currently in wide use. Some computing systems are deployed in data centers which can include thousands (or more) of individual computers or machines. The machines in such data centers often run computing systems and associated components, such as telecommunications and storage systems. Other computing systems can host services for tenants in a multi-tenant environment.

In these and other types of computing systems, it is not uncommon for the computing systems and the machines, themselves, to be maintained by maintenance computing systems that are remotely located. The maintenance computing systems often access the servers that are hosting services, or the machines in a data center, to perform maintenance operations, to debug those computing systems, and to perform other operations.

When the server or machine being maintained has a working operating system, the operating system often runs services that expose interfaces that can be accessed by the maintenance computing system to perform maintenance and debugging operations. However, server machines often have a variety of hardware, firmware, disk, and operating system problems which can prevent them from functioning correctly. Similarly, new machines that are delivered to a data center may not have a pre-loaded operating system.

When an operating system on a machine is not functional, or is not accessible (such as when a disk controller is not functioning properly), then it can be difficult to remotely debug the servers or machines, because many debugging tools can only be executed on an operating system on the machine or server under test.

The discussion above is merely provided for general background information and is not intended to be used as an aid in determining the scope of the claimed subject matter.

SUMMARY

A remote server machine, without an accessible operating system, is identified. A management computing system sends, to the remote server machine to be tested, a pre-installation environment image that has a pre-configured remote execution service disposed thereon. The pre-installation environment image is loaded into memory on the remote server machine to be tested and the remote execution service automatically runs and exposes an application programming interface (API). A client application on the management computing system interacts with the API to execute a debugging script on the remote server machine, and receives the result of the executed scripts through the API.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
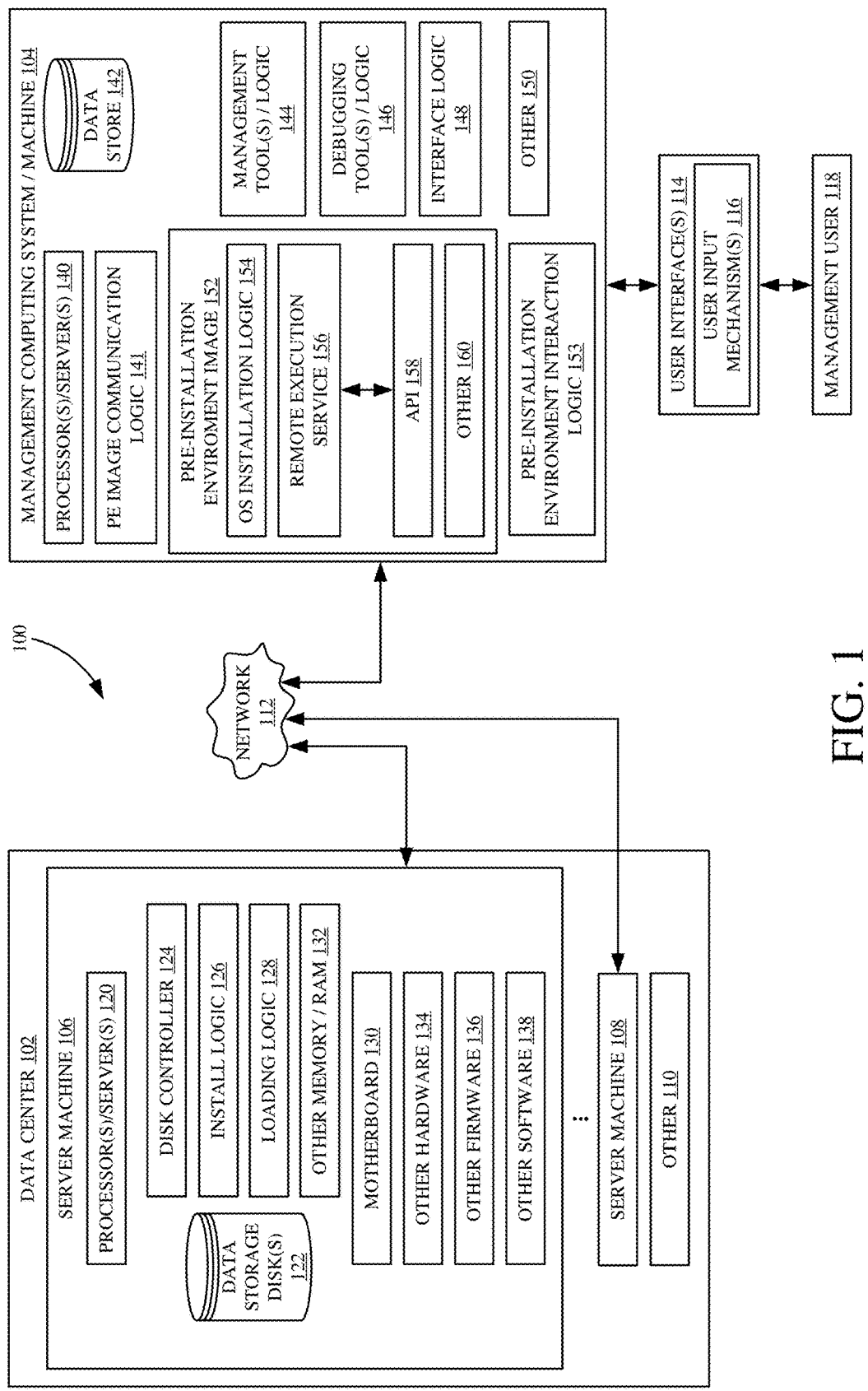
FIG. 1 is a block diagram of one example of a computing system architecture.

FIG. 1 is a block diagram of one example of a computing system architecture 100 which includes data center 102 and management computing system 104. FIG. 1 shows that data center 102 can include a plurality of server machines 106-108 and a wide variety of other items 110. Server machines 106-108 can communicate with management computing system 104 over network 112. Network 112 can be any of a wide variety of networks, such as a wide area network, a local area network, a near field communication network, a cellular communication network, or any of a wide variety of other networks or combinations of networks.

FIG. 1 also shows that, in one example, management computing system 104 generates user interfaces 114, with user input mechanisms 116, for interaction by a management user 118. Management user 118 illustratively interacts with user input mechanisms 116 in order to control and manipulate management computing system 104, and sometimes to control and manipulate (such as debug, update, maintain, etc.) portions of server machines 106-108 in data center 102.

In one example, server machines 106-108 can be similar, or different. For purposes of the present discussion, it will be assumed that they are similar so that only server machine 106 is described in more detail. Server machine 106 can include one or more processors or servers 120, and one or more data storage disks or disk drives 122. Machine 106 can include a disk controller 124 (or other storage controller), install logic 126, loading logic 128, a motherboard 130, other memory (such as Random Access Memory—RAM) 132, and it can include a wide variety of other hardware 134, other firmware 136, and other software 138.

Data storage disks 122 normally store an operating system and access to data storage disks 122 is obtained through disk controller 124. Install logic 126 can be used to install items (such as the operating system) on data storage disk 122. Loading logic 128 illustratively loads items into other memory 132, which can be random access memory (RAM) or other memory. Motherboard 130 can include a wide variety of different hardware and/or firmware that can be used in server machine 106.

Server machines 106-108 may need to have maintenance operations performed on them, such as to have updates installed, or other maintenance operations. In addition, server machines 106-108 may experience a wide variety of different problems, such as hardware problems, firmware problems, data storage disk problems, operating system problems, among others. These types of problems can inhibit the corresponding server machines 106-108 from operating correctly. Thus, the server machines 106-108 may need to be debugged, or diagnosed, or to have other debugging and diagnostic operations (referred to herein as debugging operations) performed on them.

Therefore, in one example, management user 118 uses management computing system 104 in order to gain remote access to server machines 106-108 over network 112. In the example illustrated in FIG. 1, management computing system/machine 104 can include processors or servers 140, data store 142, pre-installation environment (PE) communication logic 141, management tools/logic 144, debugging tools/logic 146, interface logic 148, pre-installation environment interaction logic 153, and it can include other items 150. Also, in one example PE image communication logic 141 has access to a pre-installation environment image 152 which may be located on management computing system/machine 104, or which may be accessible through a remote service, or otherwise. Pre-installation environment image 152 can include operating system (OS) installation logic 154, a pre-configured remote execution service 156 which, when it runs, exposes an application programming interface (API) 158. It can include a wide variety of other items 160.

Before describing the overall operation of architecture 100 in more detail, a brief description of some of the items in architecture 100, and their operation, will first be provided. Management user 118 illustratively uses management tools or logic 144 and debugging tools or logic 146 in order to perform management, debugging and/or other maintenance operations on server machines 106-108 and in order to manage, maintain and debug those machines, when they exhibit problems. However, many of the management tools or logic 144 and debugging tools or logic 146 can only be loaded and executed on a server machine 106-108 that has a functioning operating system. There are certain scenarios, however, where this is not the case. For instance, when new machines are delivered to data center 102, they may not have a preloaded operating system. In addition, when there are failures in the hard disks 122, when there are partial memory failures, or when there are other failures on a server machine, those failures may inhibit the server machine from being able to install an operating system. By way of example, suppose that the disk controller 124 on server machine 106 needs a firmware update before it starts working. Installation of an operating system is impossible because the hard disks 122 are behind the disk controller 124 (or are only accessible by using disk controller 124), which needs the firmware update in order to become operational. The tools to update the disk controller 124 need an operating system to run. However, as discussed above, the operating system can't be accessed because that requires an operational disk controller 124. In these types of scenarios, where the server machine has no accessible operating system, many of the debugging and management tools become useless.

Therefore, in accordance with one example, management user 118 illustratively interacts with user input mechanisms 116 that can be generated by pre-installation environment (PE) image communication logic 141. Logic 141, in response, causes a pre-installation environment image 152, that has a pre-configured remote execution service 156 disposed thereon, to be provided over network 112 to server machine 106 where it can be loaded into, and run from, other memory 132, such as RAM, and where it does not need to be installed on disks 122. It will be noted that image 152 can be located on management computing system 104, or it can be located on a separate service that is accessible by management computing system 104. It is shown on management computing system 104 for the sake of example only.

Once it is loaded into memory 132, remote execution service 156 is pre-configured to automatically run from memory 132 and to expose API 158 for interaction by pre-installation environment interaction logic 153. Pre-installation environment interaction logic 153 illustratively interacts with the pre-installation environment image 152 that is loaded onto server machine 106. Pre-installation environment interaction logic 153 may be a client application or another item of logic. Logic 153 can then load and execute debugging scripts on server machine 106, through API 158, and receive the results of those executed scripts, also through API 158. Thus, debugging scripts can be run, even without server machine 106 having an accessible operating system.

Similarly, as is described in greater detail below, API 158 may have a file transport API so that binary debugging tools 146 or management tools 144 can be loaded onto server machine 106, and run using scripts that are again provided by pre-installation environment interaction logic 153. In this way, management user 118 can remotely debug, manage and maintain server machines 106-108, even when they don't have an accessible operating system. This is because the pre-installation environment image 152 only needs part of memory 132 to be operational for it to run.

Once the maintenance, debugging, or management operations have been performed on server machine 106, then the operating system installation logic 154 on the pre-installation environment image can be used to install an accessible operating system onto the data storage disks 122 of server machine 106. It can then be accessed by management computing system 104.

Figure 2:
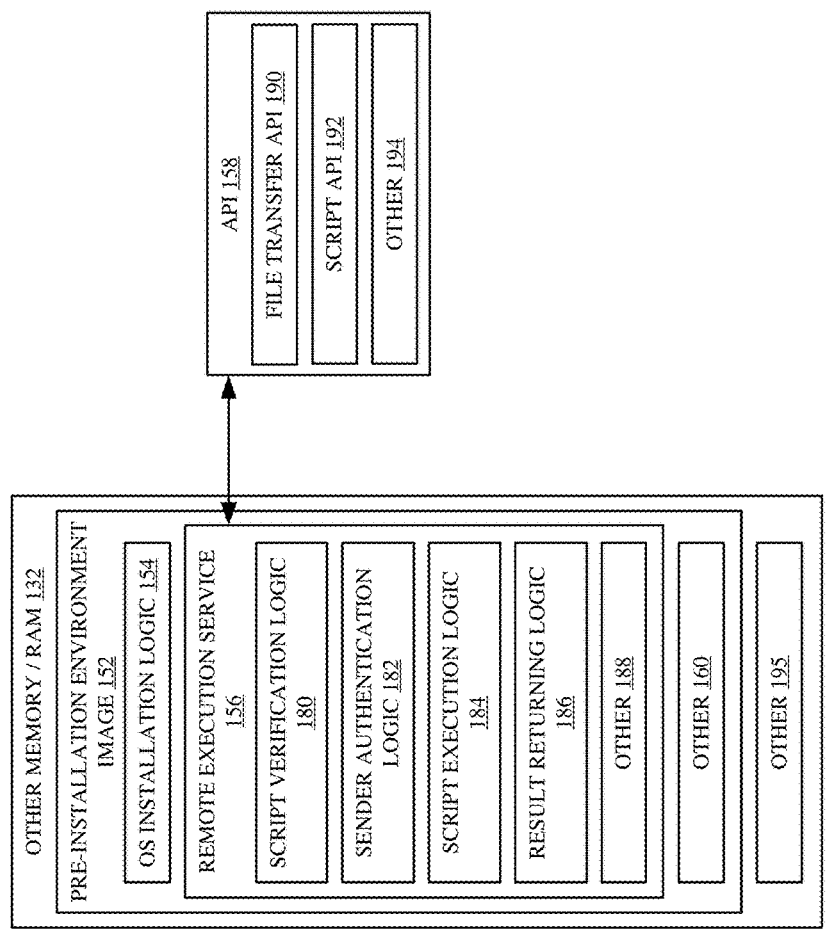
FIG. 2 is a block diagram showing one example of memory or random access memory (RAM) with a pre-installation environment image loaded thereon.

FIG. 2 is a block diagram showing one example of other memory/RAM 132, once the pre-installation environment image 152 has been installed thereon. It also shows one example of pre-installation environment image 152, in more detail. More specifically, FIG. 2 shows that memory/RAM 132 can store image 152 and other items 195. FIG. 2 also shows that remote execution service 156 can include script verification logic 180, sender authentication logic 182, script execution logic 184, result returning logic 186, and it can include other items 188. FIG. 2 also shows that, in one example, API 158 includes a file transfer API 190, a script API 192, and it can include other items 194. File transfer API 190 can be invoked by pre-installation environment interaction logic 153 (which can, again, be a client application or another item of logic) to load debugging tools 146 or management tools 144, or other items into memory or RAM 132. Script API 192 can be used to send scripts that can be executed on server machine 106, and to receive results of those scripts. The scripts can also be used to run any debugging or management tools that were loaded onto machine 106 as well.

When a script is received, script verification logic 180 can be used to verify the integrity of the script. Sender authentication logic 182 can be used to authenticate the client, the management user 118, the pre-installation environment interaction logic 153 and/or other entity that sent the script. Script execution logic 184 illustratively executes the script, automatically, and result returning logic 186 illustratively makes the results of the script available through script API 192.

Figure 3:
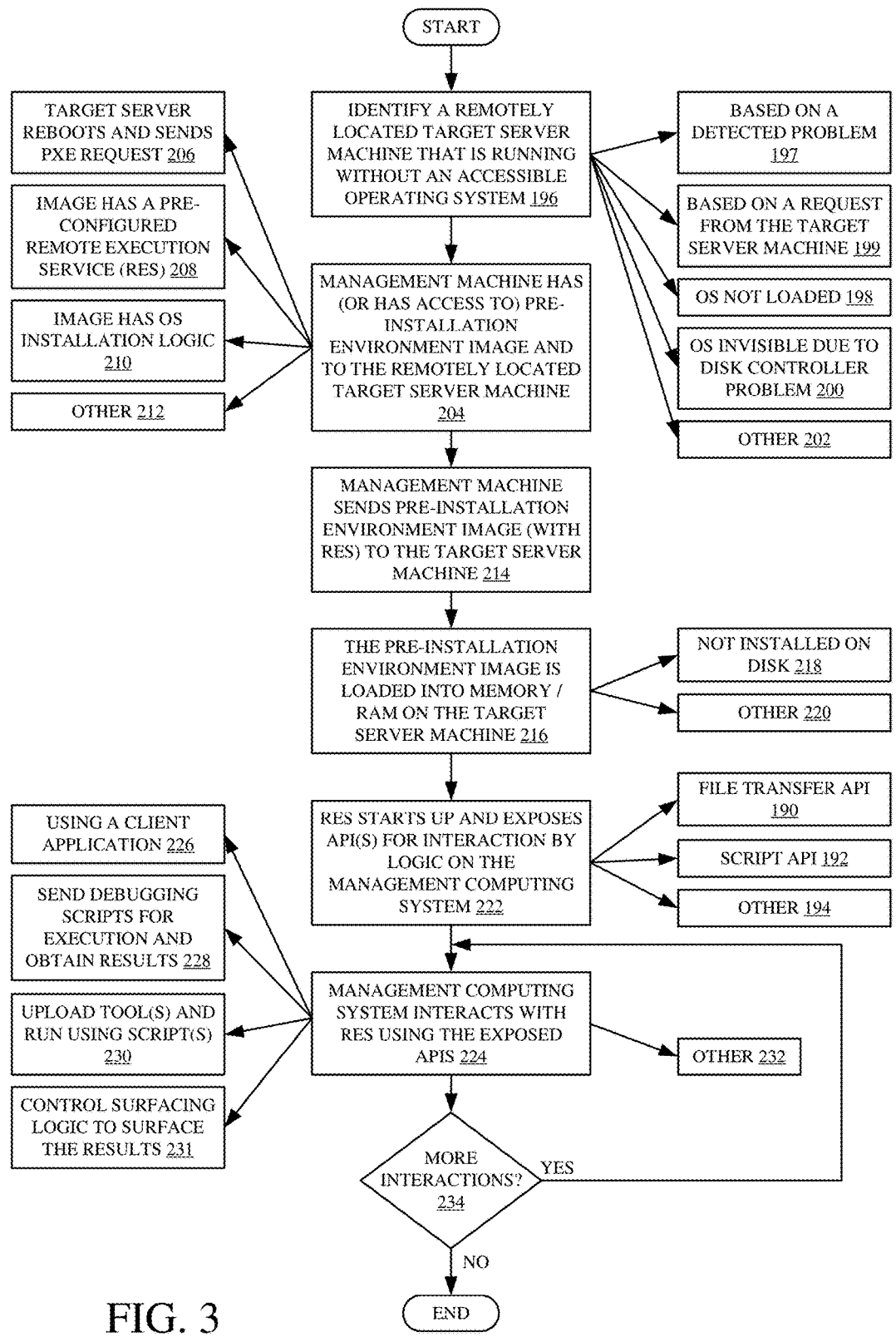
FIG. 3 is a flow diagram illustrating one example of the operation of a management computing system in more detail.

FIG. 3 is a flow diagram illustrating one example of the operation of the architecture 100 (shown in FIG. 1) in sending a pre-installation environment image 152 to server machine 106 where the pre-configured remote execution service 156 can automatically run to allow management user 118 to debug, manage or maintain server machine 106, using PE image communication logic 151 and PE interaction logic 153, even though machine 106 has no accessible operating system installed thereon. It is first assumed that PE image communication logic 151 identifies server machine 106, which is a machine that is to be targeted by management user 118 to perform management operations, maintenance operations, debugging operations, etc. It is also assumed that server machine 106 is remotely located from management computing system 104 and is running without an accessible operating system. This is indicated by block 196 in the flow diagram of FIG. 3.

Machine 106 can be identified as a machine with a detected problem, as indicated by block 197, or based on a request from server machine 106, as indicated by block 199 (because, for instance, the operating system has not yet been loaded onto it). Identifying a server with an operating system that is inaccessible because it has not yet been loaded is indicated by block 198. Identifying the server machine because the operating system is invisible due to a disk controller (or other) problem is indicated by block 200. Identifying the remotely located target server machine as a machine running without an accessible operating system in other ways is indicated by block 202.

It is also assumed that the management computing system 104 has, or has access to, a pre-installation environment image 152 and to the remotely located target server machine 106. This is indicated by block 204. In one example, the target server reboots and generates a request for a pre-installation environment image which may be responded to by management computing system 104. This is indicated by block 206. Also, in one example, the pre-installation environment image 152 illustratively has a pre-configured remote execution service (RES) 156. This is indicated by block 208. The image 152 can also have OS installation logic 154. This is indicated by block 210. The management machine can include other items as well, and this is indicated by block 212.

Management computing system 104 then sends the pre-installation environment image 152 to the server machine to be tested 106. This is indicated by block 214. This can be done by PE image communication logic 151, or by another item on management computing system 104. Loading logic 128 then loads the pre-installation environment image 152 into the memory/RAM 132 on server machine 106. This is indicated by block 216. In one example, image 152 is not installed on a hard disk 122 on machine 106. This is indicated by block 218. It can be loaded into memory in other ways as well, and this is indicated by block 220.

Once loaded, RES 156 automatically starts up and exposes API 158 for interaction by logic on the management computing system 104 (such as for interaction by pre-installation environment interaction logic 153). Having the RES 156 start up and expose the APIs 158 is indicated by block 222 in the flow diagram of FIG. 3. The API 158, as discussed above with respect to FIG. 2, can include a file transfer API 190, script API 192, or other items 194.

Once API 158 is exposed on server 106, then management computing system 104 interacts with the remote execution service 156, through APIs 158. This is indicated by block 224 in the flow diagram of FIG. 3. In one example, logic 153 can be a client application that is used by management computing system 104 to interact with machine 106 through APIs 158. This is indicated by block 226. The PE image interaction logic 153 illustratively sends scripts for execution by script execution logic 184, and receives results of that execution through result returning logic 186. Sending scripts for execution and obtaining the results is indicated by block 228 in the flow diagram of FIG. 3.

Logic 153 can also use API 190 to upload tools and then run those tools using scripts sent through script API 192. Uploading a tool through API 190 and running it using scripts sent through API 192 is indicated by block 230 in the flow diagram of FIG. 3. Management computing system 104 can control surfacing logic, in interface logic 148, to surface the results in any of a wide variety of different ways, to user 118. This is indicated by block 231. It can interact with remote execution service 156 through exposed APIs 158 in other ways as well, and this is indicated by block 232.

It may be that management user 118 performs a plurality of different interactions, using logic 153, with the remote execution service 156 in order to debug and manage or maintain server 106. If more interactions are detected, then processing reverts to block 224 in FIG. 3. This is indicated by block 234 in the flow diagram of FIG. 3.

Once the machine has been maintained, managed or otherwise debugged, then an operating system can be installed on data storage disks 122 using operating system installation logic 154.

Figure 4:
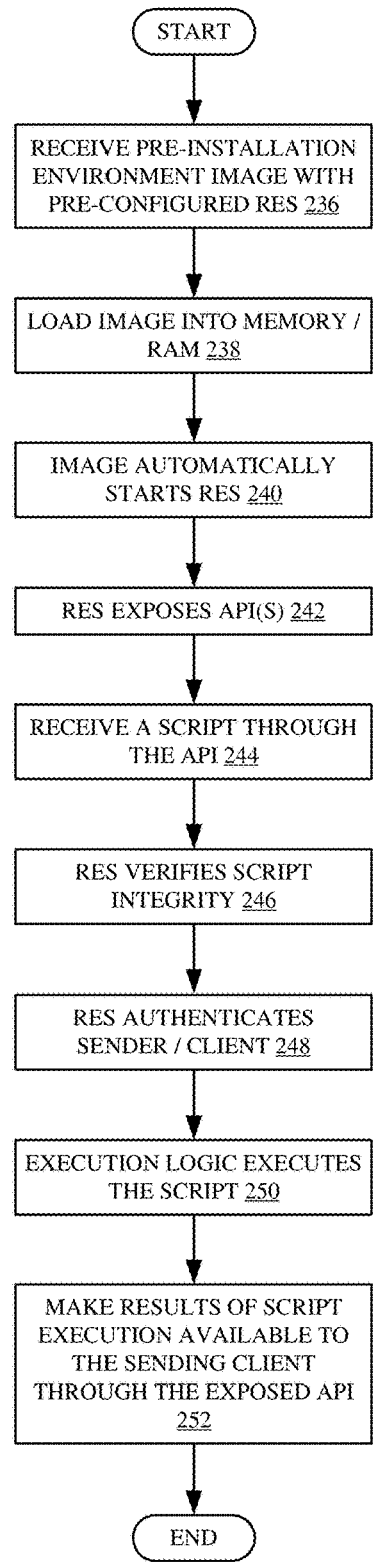
FIG. 4 is a flow diagram illustrating one example of the operation of a pre-installation environment image, once it is loaded onto a remote server machine to be tested, in more detail.

FIG. 4 is a flow diagram illustrating one example of the operation of remote execution service 156 and loading logic 128 on server 106. Loading logic 128 first receives the pre-installation environment image 152, with the pre-configured remote execution service 156. This is indicated by block 236 in the flow diagram of FIG. 4. It then loads image 152 into memory/RAM 132 as indicated by block 238.

Image 152 automatically starts and runs remote execution service 156. This is indicated by block 240. Remote execution service 156 then exposes APIs 158 for interaction by pre-installation environment interaction logic 153. Exposing the APIs is indicated by block 242 in the flow diagram of FIG. 4.

Remote execution service 156 can receive a debugging script through script API 192 from logic 153. This is indicated by block 244. Script verification logic 180 then verifies the integrity of the received script. This is indicated by block 246. Sender authentication logic 182 then authenticates the sender or client that sent the script. For instance, it may authenticate pre-installation environment interaction logic 153 (which, itself, may be a client application used by management computing system 104). Authenticating the sender or client is indicated by block 248 in the flow diagram of FIG. 4.

Script execution logic 184 then illustratively executes the received script. This is indicated by block 250. It will be appreciated that file transfer API 190 may have already received a debugging tool or a management tool or another binary and loaded that into memory 132 as well. In that case, the script that is executed may be a tool running script that is used to run that debugging tool or management tool. In another example, the debugging script may be a separate command or set of commands that is run on server 106. All of these and other arrangements are contemplated herein.

Once the script is run, result returning logic 186 illustratively makes the debugging results of the script execution available to the sending client (e.g., to logic 153) through script API 192. This is indicated by block 252. Then, as discussed above with respect to FIG. 3, logic 153 can obtain those results through API 192, and they can be surfaced for user 118. Once the machine 106 is debugged, an accessible operating system can be installed by install logic 126, if desired.

It can thus be seen that management user 118 can remotely manage, maintain, or debug a remote server, even where the server does not have an accessible operating system. Instead, the pre-installation environment image 152, with the pre-configured remote execution service 156, can be loaded into memory or RAM 132, where it automatically runs and exposes an interface that can be used by logic 153 in order to interact with server 106. For instance, it can execute debugging scripts on server 106. It can load tools onto server 106 and run them. It can return results from executing the scripts or running the tools, etc. Once the server 106 is debugged, maintained or once management steps are performed, then an operating system can be loaded onto server 106. All of this greatly enhances the operation of the data center and the management computing system 104. The data center operation is enhanced because machines in the data center can be remotely debugged and fixed, and remotely maintained, even though there is no accessible operating system on those machines. The operation of the management computing system 104 is enhanced because it allows remote access and operations (management, debugging, maintenance) to be performed on remote machines, without them having an operating system installed. All of this saves time, and increases the accuracy and overall operational health of the computing system.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
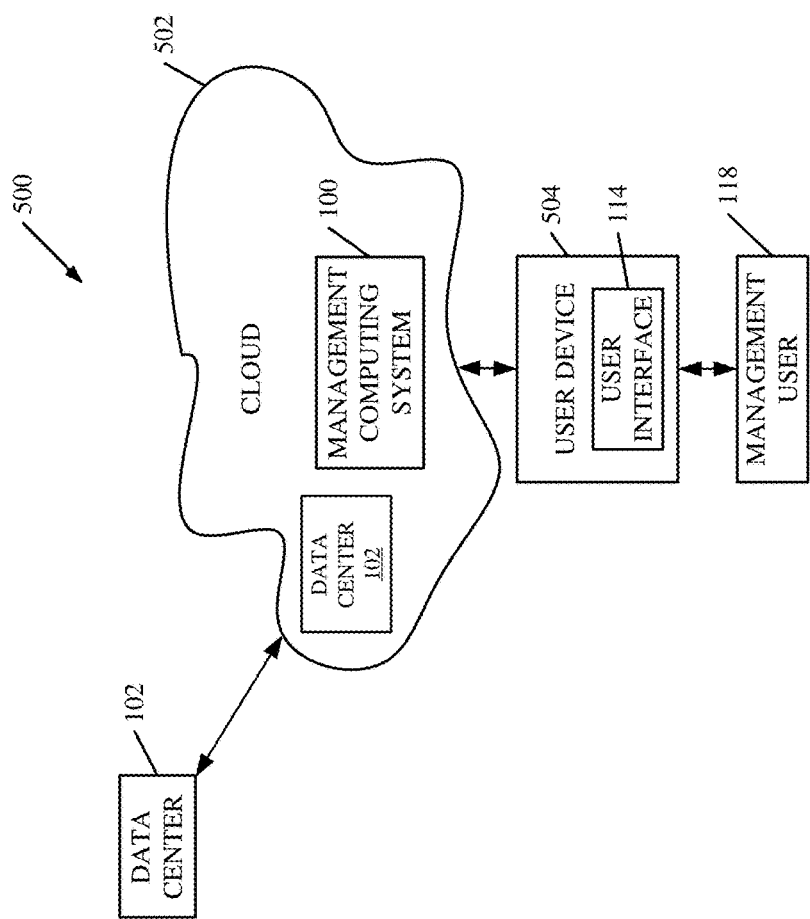
FIG. 5 is a block diagram showing the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 6:
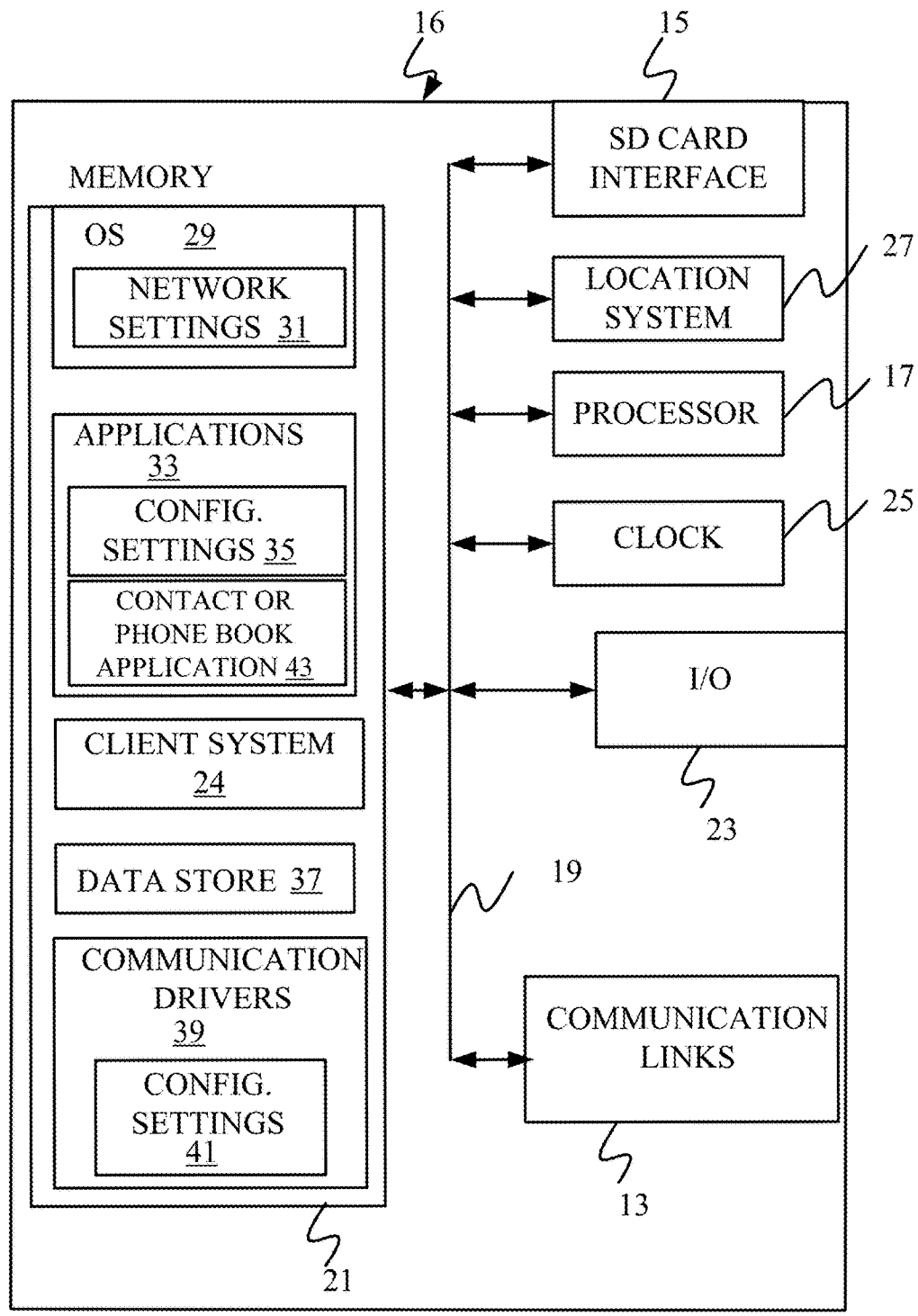
FIGS. 6-8 show examples of mobile devices that can be used in the architectures shown in the previous figures.

In the example shown in FIG. 6, some items are similar to those shown in FIG. 1 and they are similarly numbered. FIG. 6 specifically shows that data center 102 and management computing system 104 can be located in cloud 502 (which can be public, private, or a combination where portions are public while others are private). Therefore, user 118 uses a user device 504 to access those systems through cloud 502.

FIG. 5 also depicts another example of a cloud architecture. FIG. 5 shows that it is also contemplated that some elements of architecture 100 can be disposed in cloud 502 while others are not. By way of example, data center 102 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
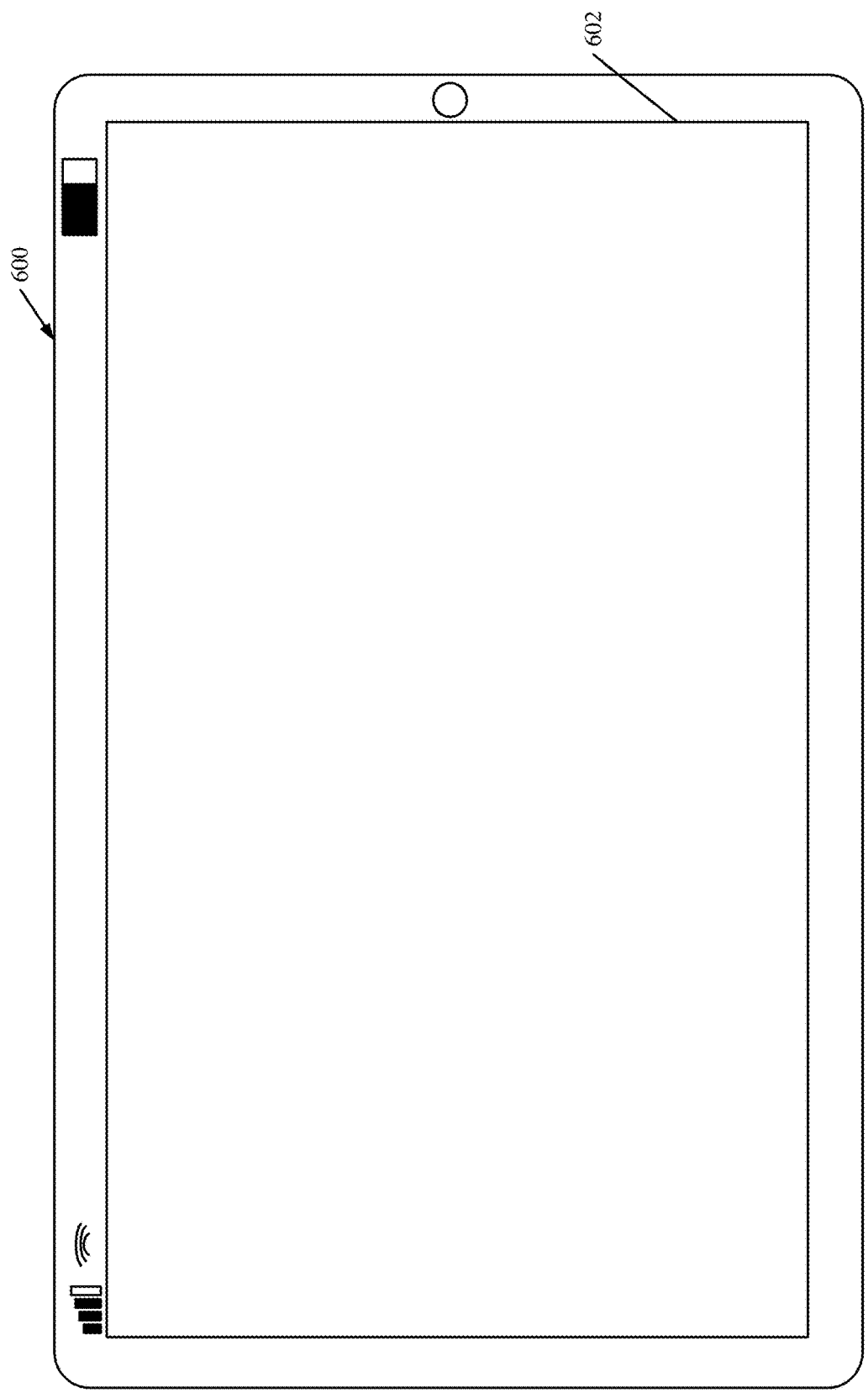
Figure 8:
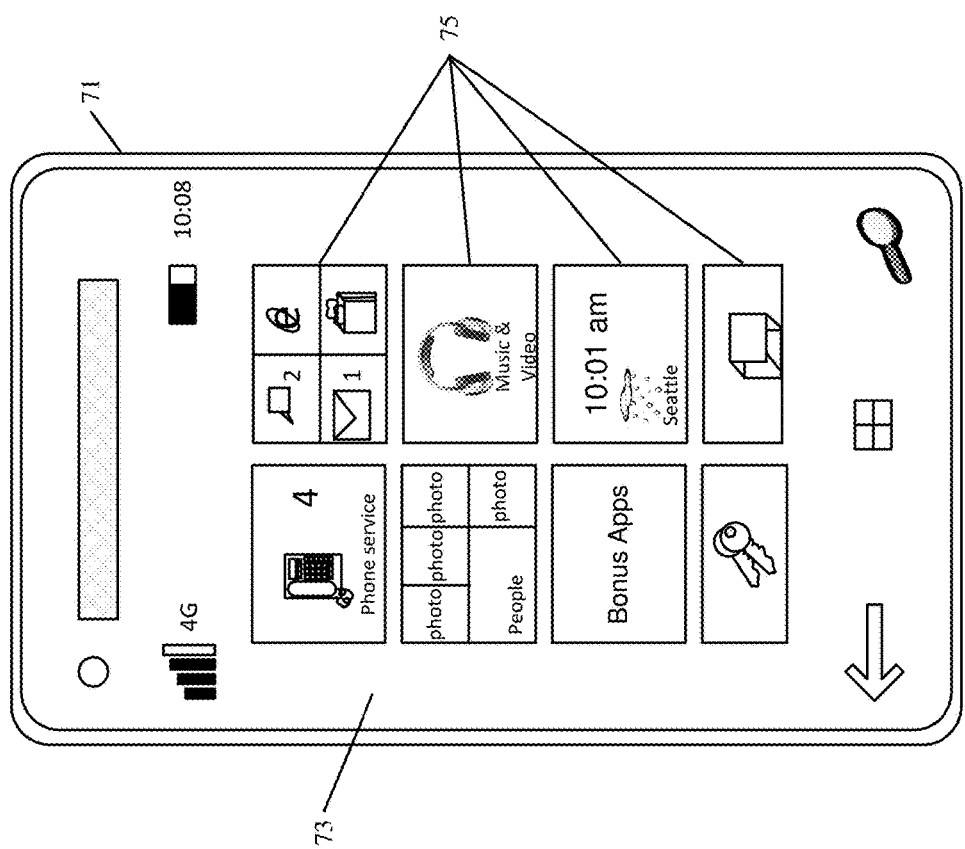

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 104 or user device 504 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
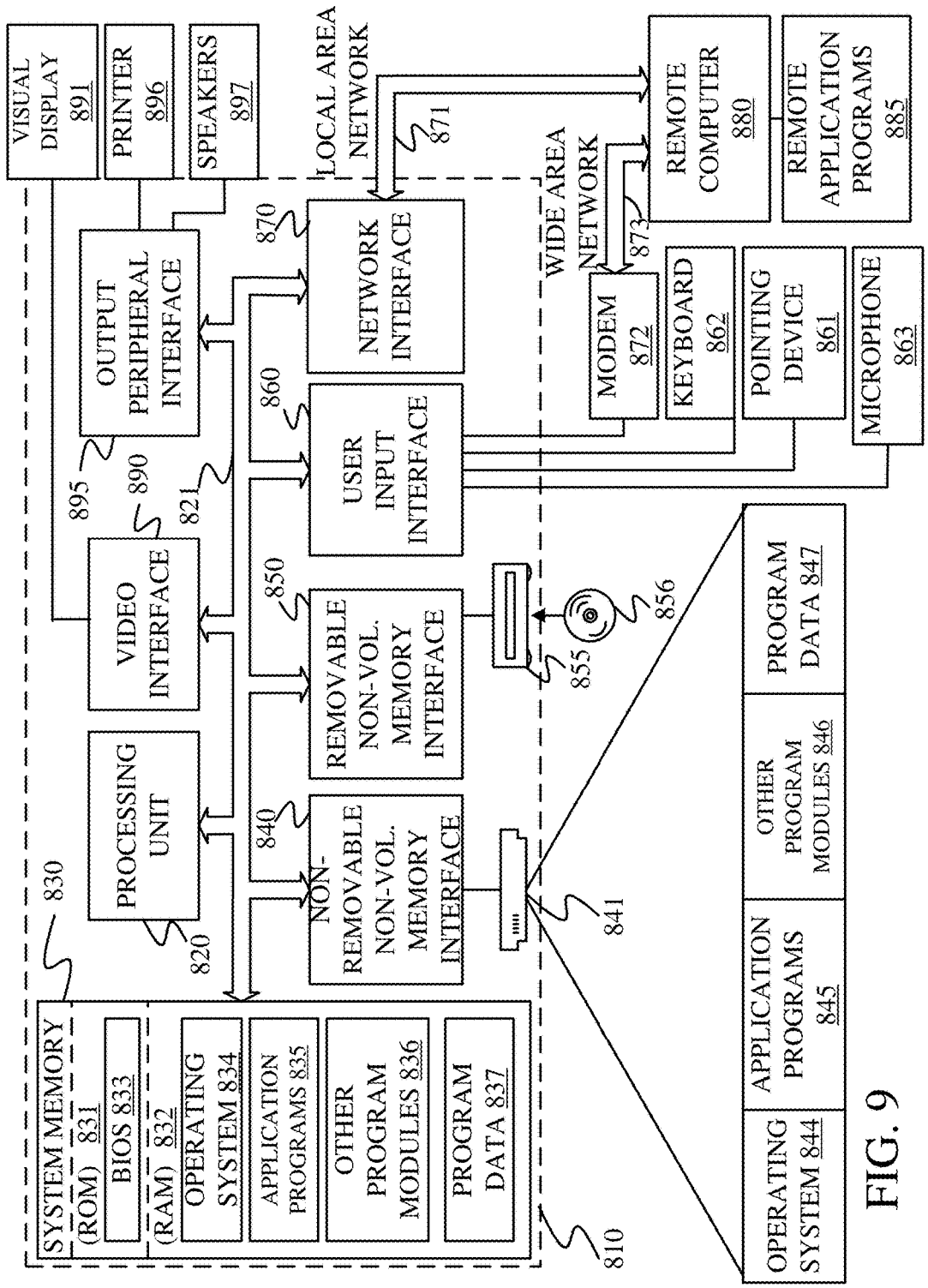
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

pre-installation environment (PE) image communication logic that sends a PE image, with pre-configured debugging script execution logic, to a remote target server machine without an accessible operating system, the PE image automatically running from random access memory (RAM) on the target server machine to expose an application programming interface (API);

PE interaction logic that sends a server debugging script to the target server machine through the exposed API, the script execution logic executing the server debugging script on the target server machine to generate debugging results, the PE interaction logic obtaining the debugging results of running the script, from the target server machine, through the exposed API; and interface logic configured to surface the debugging results of running the script, obtained through the API.

Example 2 is the computing system of any or all previous examples wherein the exposed API includes a file transfer API and wherein the PE interaction logic is configured to send a debugging tool to the target server machine through the file transfer API.

Example 3 is the computing system of any or all previous examples wherein the PE interaction logic is configured to send a tool running script, which is executed to run the debugging tool, to the target server machine through the API.

Example 4 is the computing system of any or all previous examples wherein the PE image communication logic is configured to identify the target server machine by detecting a problem on the target server machine.

Example 5 is the computing system of any or all previous examples wherein the PE image communication logic is configured to identify the target server machine by detecting a PE request from the target server machine.

Example 6 is the computing system of any or all previous examples wherein the PE image communication logic is configured to obtain the PE image from a remote service.

Example 7 is the computing system of any or all previous examples wherein the PE interaction logic comprises a client application running on the computing system.

Example 8 is a computer implemented method, comprising:

identifying a target server machine that is running without an accessible operating system;

sending the identified target server machine a pre-installation environment (PE) image, with pre-configured debugging script execution logic, the PE image automatically running from random access memory (RAM) on the target server machine to expose an application programming interface (API);

sending a server debugging script to the target server machine through the exposed API; obtaining debugging results of running the server debugging script, from the target server machine, through the exposed API; and controlling surfacing logic to surface the obtained debugging results.

Example 9 is the computer implemented method of any or all previous examples wherein the exposed API includes a file transfer API and further comprising:

sending a debugging tool to the target server machine through the file transfer API.

Example 10 is the computer implemented method of any or all previous examples wherein sending a server debugging script comprises:

sending a debugging tool running script, through the API, that is executed to run the debugging tool on the target server machine to generate the debugging results.

Example 11 is the computer implemented method of any or all previous examples wherein identifying the target server machine comprises:

receiving a request for a PE image from the target server machine.

Example 12 is the computer implemented method of any or all previous examples wherein identifying the target server machine comprises:

detecting a problem on the target server machine.

Example 13 is a computer implemented method, comprising:

receiving, on a running server machine that is running without an operating system that is accessible to a remote maintenance computing system, a pre-installation environment (PE) image, with pre-configured debugging script execution logic;

loading the PE image into random access memory (RAM);

automatically running the PE image from the RAM on the server machine to expose an application programming interface (API);

receiving, from the remote maintenance computing system, a server debugging script at the server machine through the exposed API;

executing the server debugging script on the server machine with the script execution logic to obtain debugging results; and providing the debugging results to the remote maintenance computing system through the exposed API.

Example 14 is the computer implemented method of any or all previous examples and further comprising:

receiving a debugging tool from the remote maintenance computing system through the API; and loading the debugging tool into RAM.

Example 15 is the computer implemented method of any or all previous examples wherein receiving the server debugging script comprises receiving a tool running script.

Example 16 is the computer implemented method of any or all previous claims wherein executing the server debugging script comprises:

executing the tool running script to run the debugging tool to generate the debugging results.

Example 17 is the computer implemented method of any or all previous examples and further comprising:

prior to receiving the PE image, generating a PE request to the remote maintenance computing system and receiving the PE image in response to the PE request.

Example 18 is the computer implemented method of any or all previous examples wherein receiving the PE image comprises:

receiving the PE image from a client application running on the remote maintenance computing system.

Example 19 is the computer implemented method of any or all previous examples and further comprising:

authenticating the client application before executing the server debugging script.

Example 20 is the computer implemented method of any or all previous examples and further comprising:

verifying script integrity of the server debugging script prior to executing the server debugging script.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   identify a remote target server machine without an accessible operating system;
   send a pre-installation environment (PE) image, with pre-configured debugging script execution logic, to the identified remote target server machine without an accessible operating system, the PE image configured to automatically run from random access memory (RAM) on the target server machine to expose at least one application programming interface (API);

send a server debugging script to the target server machine through the at least one API, the script execution logic configured to execute the server debugging script on the target server machine to generate debugging results;

obtain the debugging results of running the script, from the target server machine, through the at least one API; and surface the debugging results of running the script, obtained through the at least one API.

2. The computing system of claim 1 wherein the at least one API includes a file transfer API and wherein the instructions, when executed, cause the computing system to send a debugging tool to the target server machine through the file transfer API.

3. The computing system of claim 2 wherein the instructions, when executed, cause the computing system to send a tool running script, which is executed to run the debugging tool, to the target server machine through the at least one API.

4. The computing system of claim 1 wherein the instructions, when executed, cause the computing system to identify the target server machine by detecting a problem on the target server machine.

5. The computing system of claim 1 wherein the instructions, when executed, cause the computing system to identify the target server machine by detecting a PE request from the target server machine.

6. The computing system of claim 1 wherein the instructions, when executed, cause the computing system to obtain the PE image from a remote service.

7. The computing system of claim 1 wherein the server debugging script is sent by a client application running on the computing system.

8. A computer implemented method, comprising:
identifying a target server machine that is running without an accessible operating system;
sending, to the identified target server machine without an accessible operating system, a pre-installation environment (PE) image with pre-configured debugging script execution logic, the PE image automatically running from random access memory (RAM) on the target server machine to expose an application programming interface (API);
sending a server debugging script to the target server machine through the exposed API;
obtaining debugging results of running the server debugging script, from the target server machine, through the exposed API; and
controlling surfacing logic to surface the obtained debugging results.

9. The computer implemented method of claim 8 wherein the exposed API includes a file transfer API and further comprising:
sending a debugging tool to the target server machine through the file transfer API.

10. The computer implemented method of claim 8 wherein the exposed API includes a script API, and sending a server debugging script comprises:
sending a debugging tool running script, through the script API, that is executed to run the debugging tool on the target server machine to generate the debugging results.

11. The computer implemented method of claim 10 wherein identifying the target server machine comprises:
receiving a request for a PE image from the target server machine.

12. The computer implemented method of claim 10 wherein identifying the target server machine comprises:
detecting a problem on the target server machine.

13. A computer implemented method, comprising:
receiving, on a running server machine that is running without an operating system that is accessible to a remote maintenance computing system, a pre-installation environment (PE) image, with pre-configured debugging script execution logic;
loading the PE image into random access memory (RAM);
automatically running the PE image from the RAM on the server machine to expose an application programming interface (API);
receiving, from the remote maintenance computing system, a server debugging script at the server machine through the exposed API;
executing the server debugging script on the server machine with the script execution logic to obtain debugging results; and
providing the debugging results to the remote maintenance computing system through the exposed API.

14. The computer implemented method of claim 13 and further comprising:
receiving a debugging tool from the remote maintenance computing system through the API; and
loading the debugging tool into RAM.

15. The computer implemented method of claim 14 wherein receiving the server debugging script comprises receiving a tool running script.

16. The computer implemented method of claim 15 wherein executing the server debugging script comprises:
executing the tool running script to run the debugging tool to generate the debugging results.

17. The computer implemented method of claim 13 and further comprising:
prior to receiving the PE image, generating a PE request to the remote maintenance computing system and receiving the PE image in response to the PE request.

18. The computer implemented method of claim 13 wherein receiving the PE image comprises:
receiving the PE image from a client application running on the remote maintenance computing system.

19. The computer implemented method of claim 18 and further comprising:
authenticating the client application before executing the server debugging script.

20. The computer implemented method of claim 19 and further comprising:
verifying script integrity of the server debugging script prior to executing the server debugging script.

* * * * *